(12) United States Patent
Koenig et al.

(10) Patent No.: US 7,738,745 B2
(45) Date of Patent: Jun. 15, 2010

(54) METHOD OF BIASING AND OPERATING ELECTRO-OPTIC POLYMER OPTICAL MODULATORS

(75) Inventors: Mary K. Koenig, Seattle, WA (US); Raluca Dinu, Redmond, WA (US)

(73) Assignee: GigOptix, Inc., Palo Alto, CA (US)

( * ) Notice: Subject to any disclaimer, the term of this patent is extended or adjusted under 35 U.S.C. 154(b) by 484 days.

(21) Appl. No.: 11/539,397

(22) Filed: Oct. 6, 2006

(65) Prior Publication Data
US 2008/0298735 A1     Dec. 4, 2008

Related U.S. Application Data

(60) Provisional application No. 60/724,174, filed on Oct. 6, 2005.

(51) Int. Cl.
*G02F 1/035* (2006.01)
*G02F 1/295* (2006.01)

(52) U.S. Cl. .............................. 385/2; 385/8

(58) Field of Classification Search ............... 385/2, 385/8
See application file for complete search history.

(56) References Cited

U.S. PATENT DOCUMENTS

| | | | |
|---|---|---|---|
| 6,714,333 B2 * | 3/2004 | Ash | 359/238 |
| 6,914,999 B2 * | 7/2005 | Breukelaar et al. | 385/20 |
| 7,260,280 B2 * | 8/2007 | Ichioka et al. | 385/8 |
| 7,321,702 B2 * | 1/2008 | Akiyama et al. | 385/3 |

OTHER PUBLICATIONS

Park, S., J.J. Ju, J.Y. Do, S.K. Park, M. Lee, "Thermal bias operation in electro-optic polymer modulators", Applied Physics Letters, Vo. 83, No. 5, 827-9 (2003).*
Park et al., "Thermal bias operation in electro-optic polymer modulators," *Appl. Phys. Lett.*, 2003, 83:827-829.

* cited by examiner

*Primary Examiner*—Charlie Peng
(74) *Attorney, Agent, or Firm*—Graybeal Jackson LLP

(57) ABSTRACT

A method that includes (a) thermally biasing an electro-optic polymer device using an electrode; and (b) driving the electro-optic polymer device by applying a high frequency signal to the device using the same electrode.

22 Claims, 3 Drawing Sheets

METHOD OF BIASING AND OPERATING ELECTRO-OPTIC POLYMER OPTICAL MODULATORS

RELATED APPLICATIONS

This application claims the benefit of priority under 35 U.S.C. §119(e)(1) to U.S. provisional application 60/724,174, filed Oct. 6, 2005.

BACKGROUND OF THE INVENTION

All patents, patent applications, and publications cited within this application are incorporated herein by reference to the same extent as if each individual patent, patent application or publication was specifically and individually incorporated by reference.

The invention relates generally to active optical waveguide devices. Electro-optic polymer waveguide devices are attractive candidates for optical communication devices that operate at high speed and low electrical power. In addition, the good speed match between the optical and microwave signals enables high bandwidth operation. Some optical communication devices, such as Mach-Zehnder modulators, operate at microwave (RF) frequencies using a separate DC electrical bias, which usually requires a separate electrode in addition to the microwave electrode. DC bias drift is a critical factor for long-term performance of commercially viable modulators. EO polymer modulators generally have a large amount of DC bias drift, and this has been addressed using thermal biasing techniques, for example see: S. Park, et al. *Appl. Phys. Lett.* 83, 827-829 (2003). This technique requires a separate "heater" electrode, which decreases the active length of the microwave electrode or hinders push-pull operation, thereby causing the driving voltage to increase. The heater electrode is also thicker than the microwave electrode, or is fabricated from a different metal altogether, which increases the number of fabrication steps and device costs. Thus, electro-optic polymer modulators need new device structures or new methods that bias the modulator without causing a decrease in the active length of the microwave electrode.

SUMMARY OF THE INVENTION

The inventors have found that a single electrode can be used to both thermally bias and drive an electro-optic polymer device at microwave frequencies. This avoids the need to fabricate a separate electrode and shorten the active length of the drive electrode. Thus, one embodiment is a method comprising using one electrode to both thermally bias and operate an electro-optic polymer device at high frequencies. The high frequencies can be anywhere from 1 GHz to 10 THz. The typical frequency is microwave or RF frequencies, e.g., between 1 GHz and 60 GHz. Another embodiment is method, comprising a) applying a current to an electrode to thermally bias an electro-optic polymer device and b) applying a high frequency drive signal to the electrode to operate the electro-optic polymer device.

DETAILED DESCRIPTION

One embodiment is a method comprising using one electrode to both thermally bias and operate an electro-optic polymer device at high frequencies. The high frequencies can be anywhere from 1 GHz to 10 THz. The typical frequency is microwave or RF frequencies, e.g., between 1 GHz and 60 GHz. The bias point induced by the thermal bias can be at any point along the transfer function, but is typically at −3 dB optical. The modulator can be operated with either digital transmission or analog transmission. In most embodiments, the thermal bias and high frequency driving voltage are applied through the same leads on the modulator. When this is the case, a bias tee, for example, can be used to provide DC and RF ports to the lead. Separate connectors can be used to attach the leads for the thermal biasing and the leads for the high frequency driving voltage.

Figure 1:
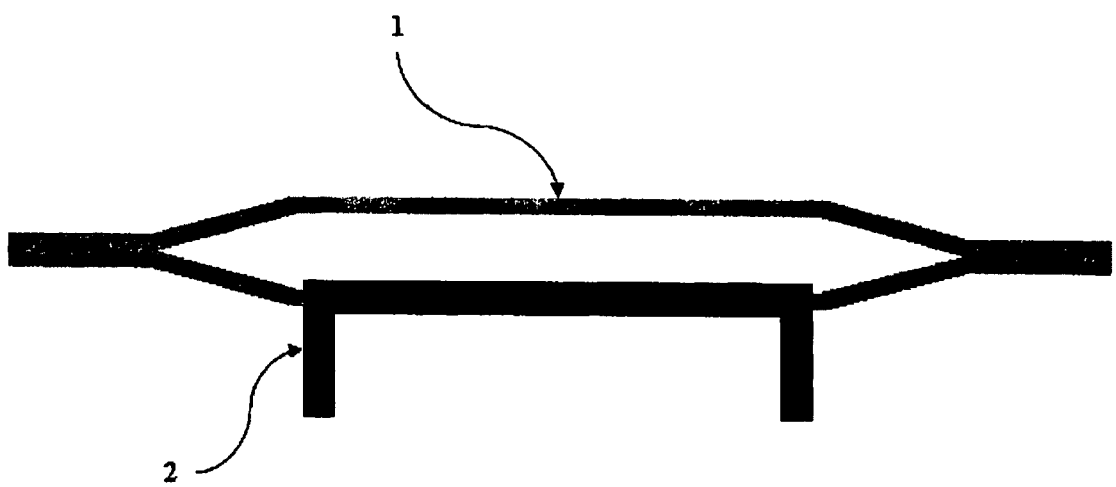
FIG. 1 is a schematic illustration of a Mach-Zehnder modulator an electrode for thermal biasing and high frequency operation.
Figure 2:
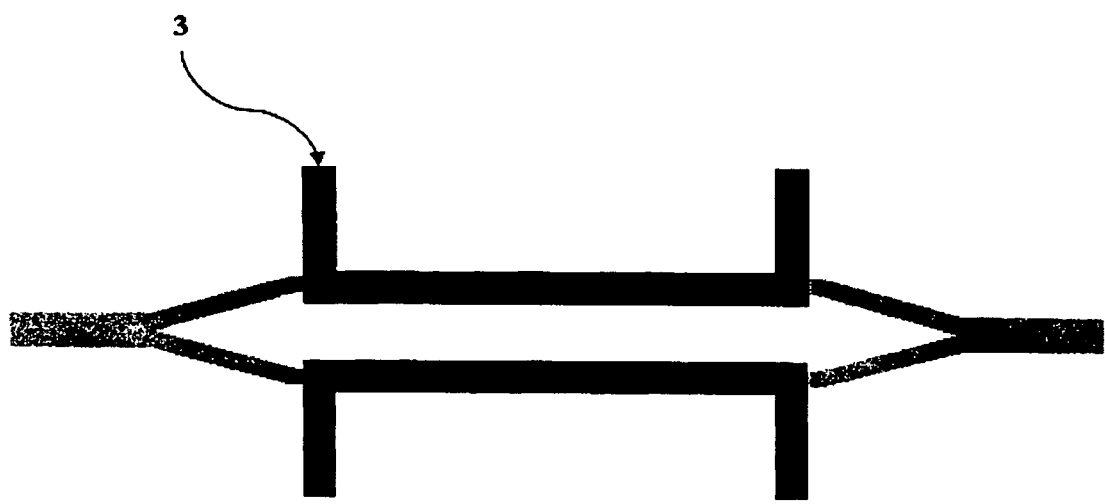
FIG. 2 is a schematic illustration of a Mach-Zhender modulator with two electrodes for push-pull driving.

Another embodiment is a method, comprising a) applying a current to an electrode to thermally bias an electro-optic polymer device and b) applying a high frequency drive signal to the electrode to operate the electro-optic polymer device. In many embodiments, referring to FIG. 1, the electro-optic polymer device is a Mach-Zehnder modulator (1) and the electrode is positioned (2) over one arm of the Mach-Zehnder modulator. In some embodiments, referring to FIG. 2, a second electrode (3) is used to apply another high frequency signal in order to drive the device in a push-pull manner. When there are two electrodes, the thermal bias is typically applied to only one electrode. In other embodiments, the electrode has two paths that cover both arms of the Mach-Zehnder modulator, i.e., the electrode is bifurcated (4). The electro-optic polymer may form the waveguide core, at least one of the waveguide clads, or both the waveguide core and at least one of the waveguide clads. The waveguide may have more than two clads. Any one of the waveguide clads may comprise organic materials (e.g., polymers), inorganic materials (e.g., silicon), or hybrid organic/inorganic materials (e.g., sol-gel materials). The waveguide may have clads with any combination of materials. In some embodiments, the waveguide core comprises silicon and the at least one clad comprises the electro-optic polymer.

In many embodiments, the electrode comprises gold. Gold electrodes are favorable because of high conductivity and low RF loss. The electrode may also have an adhesion metal (e.g., chromium or titanium) between itself and the clad material. The electrode is typically in a microstrip configuration, i.e., with a ground plane on a substrate, a polymer stack that comprises the electro-optic waveguide, and an electrode on top of the polymer stack that is used for the thermal bias and high frequency operation. In many embodiments, the electrode forms a thermal bias circuit with a feedback loop to control the power used for thermal biasing. The electrode may have a taper before the active region to facilitate coupling to an RF source. In many embodiments, the coupling is done through a package with a 2.92 mm coax connector for 40 GHz operation or connectors designed for higher frequency operation. Packages are desirable for discrete, external polymer modulators since they can be hermetically sealed. In most embodiments, the electrode is in a microstrip configuration, with the ground plane being the bottom electrode. The thickness of the electrode may be, for example, from 4-30 µm. Under operation, the electrode is typically terminated at 50 ohms. The length of the electrode in the active region of the device may be from 5-100 mm. A voltage of 5-7 V and a current of 14-20 mA, for example, are typically applied to the electrode through a 200-300 Ohm resistor to affect thermal bias. The voltage and the current applied will depend on the desired bias point, how the voltages and current are applied, the resistance of the electrode (which depends, for example, on the material the electrode is made from), the length of the electrode, etc.

EXAMPLES

The following example(s) is illustrative and does not limit the Claims.

Figure 3:
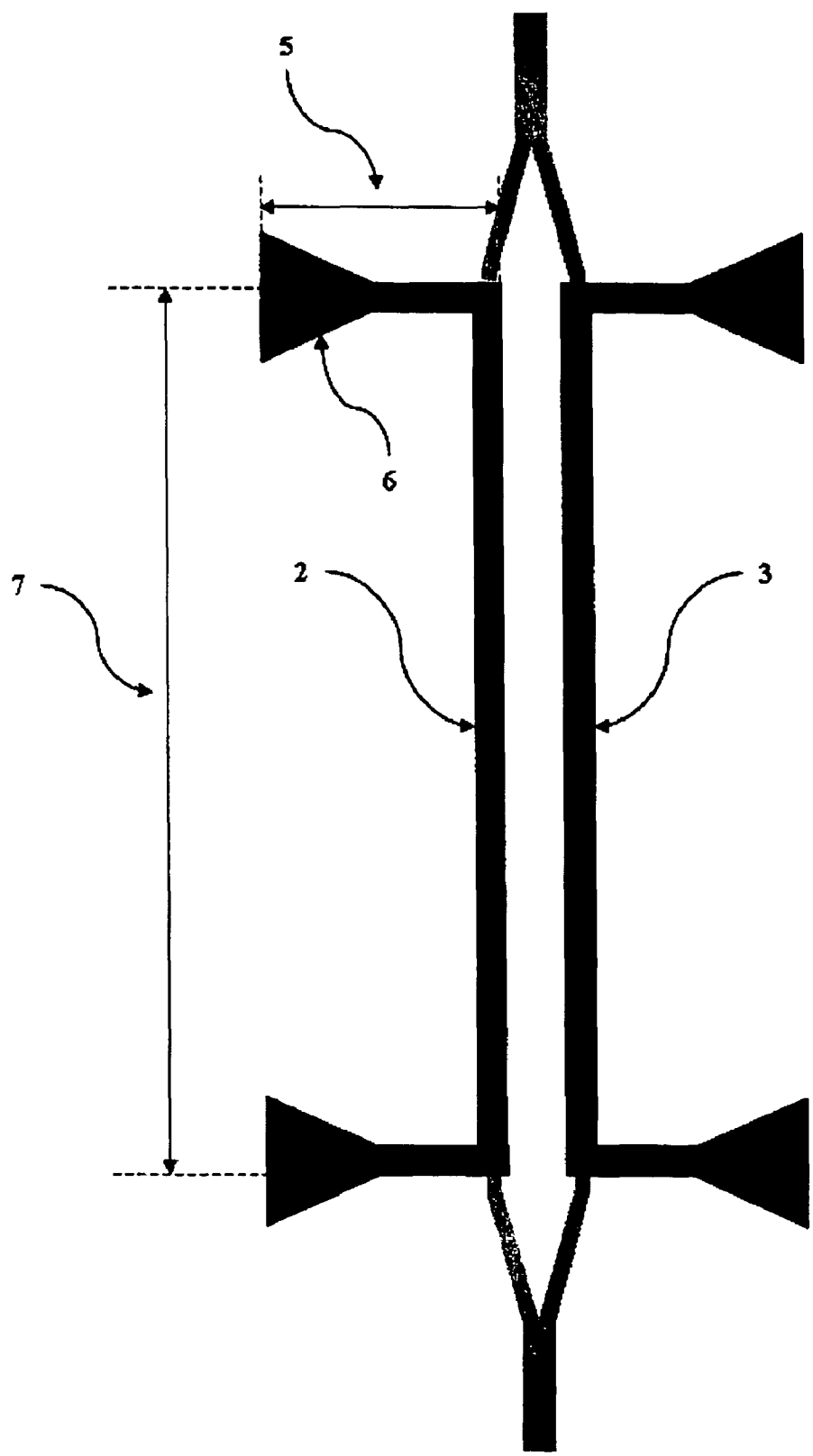
FIG. 3 is a schematic illustration of a Mach-Zehnder modulator used in one example.

An electro-optic polymer modulator was fabricated by: 1) patterning a bottom ground plane of gold on a silicon substrate; 2) spin depositing and curing a UV crosslinkable polymer as the bottom clad with a refractive index of 1.50 to a thickness of 2.8 μm; 3) patterning a waveguide in photoresist on the bottom clad and dry etching a trench to a depth of 0.8 μm and a width of 3.5 μm in the bottom clad; 4) spin depositing a and curing a nonlinear optical polymer core to a thickness of 3.2 μm (above the planar part of the bottom clad), which gap fills the trench in the bottom clad to form the waveguide (in this case a "quasi-trench" waveguide); 5) spin depositing and curing a UV crosslinkable polymer as the top clad with a refractive in of 1.50 and a thickness of 2.8 μm; 6) patterning an electrode on the top clad and poling the nonlinear optical polymer; 7) removing the poling electrode; and 8) patterning and electroplating two high-speed top electrodes on the top clad to a thickness of 4-5 μm. The wafer was diced to give individual modulators. The dimensions of the electrodes are shown schematically in FIG. 3, which is not drawn to scale and also shoes the Mach-Zehnder waveguide underneath the electrodes. The electrode (2) and the second electrode (3) each was fabricated with two 0.5 cm segments (5) including tapers (6) leading into and out of the 2.1 cm active region (7). A 1550 nm laser was butt-coupled to the waveguide facet and the $V_\pi$ with one electrode driving was 5.2 V, and with two electrodes (push-pull driving) was 2.6 V. For the thermal biasing and operating, a bias tee was connected to on of the tapers of the electrode (2). The bias tee had an RF port and a DC port. The modulator was biased to approximately −3 dB by applying 6 V and 15 mA to the electrode. This produced a power through the electrode of approximately 90 mW. To operate the modulator, RF was applied to the RF port at frequencies up to 40 GHz, which was limited only by the particular RF generator used. An RF frequency was also applied to the second arm to give a modulator operating at a $V_\pi$ of 5.2 V with a stable thermal bias through the electrode (2).

The invention claimed is:

1. A method comprising:
   (a) thermally biasing a first arm of a Mach-Zehnder electro-optic polymer device using an electrode; and
   (b) electro-optically modulating the electro-optic polymer device by applying a high frequency signal to the first arm of the device using the same electrode.

2. A method according to claim 1 wherein the high frequency signal ranges from 1 GHz to 1 THz.

3. A method according to claim 1 wherein the high frequency signal ranges from 1 GHz to 60 GHz.

4. A method according to claim 1 wherein the electro-optic polymer device comprises a Mach-Zehnder modulator having a plurality of arms.

5. A method according to claim 4 wherein the electrode is positioned over one arm of the modulator.

6. A method according to claim 4 wherein the electrode is bifurcated and positioned over two arms of the modulator.

7. A method according to claim 1 wherein the electrode comprises gold.

8. A method according to claim 1 wherein the electrode is in a microstrip configuration.

9. A method according to claim 1 wherein the electrode forms a thermal bias circuit with a feedback loop to control the power used for thermal biasing.

10. A method according to claim 1 further comprising applying a second high frequency signal to the device using a second electrode to drive the device in a push-pull manner.

11. The method of claim 1, wherein thermally biasing one arm of a Mach-Zehnder electro optic polymer device is performed by raising the temperature of the electrode to bias an index of refraction of the arm; and
    wherein modulating the electro-optic polymer device using the same electrode is performed by modulating an electrical potential of the electrode to modulate the index of refraction of the arm.

12. An electro-optic polymer device, comprising:
    two modulation channels; and
    an electrode configured to apply both a thermal bias and high frequency electro-optic modulation to a first one of the light modulation channels.

13. The electro-optic polymer device of claim 12, wherein the electrode is configured to apply electro-optic modulation to the light modulation channel having at least one frequency between 1 GHz and 1 THz.

14. The electro-optic polymer device of claim 12, wherein the electrode is configured to apply electro-optic modulation to the light modulation channel having at least one frequency between 1 GHz and 60 GHz.

15. The electro-optic polymer device of claim 12, wherein a second light modulation channel of the two light modulation channels is configured to cooperate with the first light modulation channel as a Mach-Zehnder modulator having a plurality of arms.

16. The electro-optic polymer device of claim 15, wherein the electrode is positioned over one arm of the modulator.

17. The electro-optic polymer device of claim 15, wherein the electrode is bifurcated and positioned over two arms of the modulator.

18. The electro-optic polymer device of claim 12, wherein the electrode comprises gold.

19. The electro-optic polymer device of claim 12, wherein the electrode is in a microstrip configuration.

20. The electro-optic polymer device of claim 12, wherein the electrode forms a thermal bias circuit with a feedback loop to control the power used for thermal biasing.

21. The electro-optic polymer device of claim 12, further comprising a second electrode configured to apply a second high frequency signal to the device; wherein the electrode and second electrode are configured to cooperate to drive the device in a push-pull manner.

22. The electro-optic polymer device of claim 12, wherein the electro-optic polymer device is configured to modulate light in the first channel by modulating index of refraction responsive to an electrical potential of the electrode and to bias light in the first channel by biasing index of refraction responsive to a temperature of the electrode.

* * * * *